United States Patent [19]
Swisher, Jr. et al.

[11] Patent Number: 6,110,430
[45] Date of Patent: Aug. 29, 2000

[54] DECONTAMINATION PLANT INCLUDING AN INDIRECTLY HEATED DESORPTION SYSTEM

[75] Inventors: George W. Swisher, Jr.; Jerry R. Collette, both of Oklahoma City; Jianmin Zhang, Norman, all of Okla.

[73] Assignee: CMI Corporation, Oklahoma City, Okla.

[21] Appl. No.: 09/056,033

[22] Filed: Apr. 6, 1998

[51] Int. Cl.[7] .................................................. B01D 53/34
[52] U.S. Cl. .......................... 422/173; 422/168; 422/187; 422/198; 422/202; 110/226; 110/236; 588/209; 588/228; 34/135; 34/136; 34/137
[58] Field of Search .................................. 422/168–173, 422/187, 198, 202, 1, 32; 110/236, 246, 226; 588/209, 228; 34/135–137

[56] References Cited

U.S. PATENT DOCUMENTS

| | | | |
|---|---|---|---|
| 1,187,959 | 6/1916 | Ash | 366/22 |
| 1,216,667 | 2/1917 | Downs | 432/14 |
| 1,444,794 | 2/1923 | Kernan | 241/167 |
| 1,524,397 | 1/1925 | Jones | 432/105 |
| 1,731,898 | 10/1929 | Heine | 432/111 |
| 1,754,854 | 4/1930 | Gelstharp | 432/111 |
| 1,904,781 | 4/1933 | Crawford | 266/145 |
| 2,049,734 | 8/1936 | Fasting | 432/106 |
| 2,063,233 | 12/1936 | Debuch | 422/209 |
| 2,252,279 | 8/1941 | Zirngibl et al. | 422/189 |
| 2,354,747 | 8/1944 | Epstein et al. | 110/237 |
| 2,590,090 | 3/1952 | DeVaney | 432/5 |
| 2,602,388 | 7/1952 | Elliott et al. | 47/1.42 |
| 2,654,592 | 10/1953 | Harris | 432/109 |
| 2,775,174 | 12/1956 | Petrick | 171/189 |
| 2,967,094 | 1/1961 | Mitchell | 422/170 |
| 3,087,715 | 4/1963 | Dailey, Jr. | 432/69 |
| 3,195,608 | 7/1965 | Voorheis et al. | 432/49 |
| 3,215,501 | 11/1965 | Phillips | 422/170 |
| 3,452,690 | 7/1969 | Tarbox et al. | 110/237 |
| 3,488,700 | 1/1970 | Iken et al. | 432/22 |
| 3,604,375 | 9/1971 | Bruns et al. | 110/238 |
| 3,687,646 | 8/1972 | Brent et al. | 48/209 |
| 3,693,945 | 9/1972 | Brock | 366/2 |

(List continued on next page.)

FOREIGN PATENT DOCUMENTS

| | | |
|---|---|---|
| 1121749 | 4/1982 | Canada . |
| 8105677 | 12/1981 | Netherlands . |

OTHER PUBLICATIONS

"Seven Years Experience in Thermal Soil Treatment", Rudolf C. Reintjes and Cees Schuler, Ecotechniek bv, Utracht, The Netherlands, Jun. 1989, Atlanta, Georgia.

Asphalt Institute Publication, Principles of Construction of Hot–Mix Asphalt Pavements, dated Jan. 1983.

"How to Burn Salty Sludges", Chemical Engineering, Apr. 14, 1975.

Consider Fluid–Bed Incineration for Hazardou Waste Destruction, Chemical Engineering Progress, Jun. 1992.

*Primary Examiner*—Hien Tran
*Attorney, Agent, or Firm*—Dunlap, Codding & Rogers, PC

[57] ABSTRACT

The present invention is a decontamination plant for removing contaminates from contaminated material. The decontamination plant comprises an outer shell including a cavity therein. A drum formed of heat conductive material is rotatably mounted in the cavity defined by the outer shell so as to form an annular heating chamber between the drum and the outer shell. A plurality of heat sources are positioned to discharge heat into the annular heating chamber. The drum also has an inner surface defining a decontamination chamber. A tube is concentrically supported within the decontamination chamber formed in the drum. The tube has an inlet which is in communication with the annular heating chamber so as to receive flue gases therefrom. The outlet of the tube is positioned to exhaust gases from the drum. The drum is slightly inclined from a material receiving opening to a soil discharge end so as to cause the material which is being decontaminated to progress through the decontamination chamber as the drum rotates. While the material is passing through the decontamination chamber, the material is held in contact with the heating drum and the heated tube so as to heat the material via conduction.

12 Claims, 3 Drawing Sheets

U.S. PATENT DOCUMENTS

| | | | |
|---|---|---|---|
| 3,705,711 | 12/1972 | Seelandt et al. | 432/1 |
| 3,714,038 | 1/1973 | Marsh | 260/1 |
| 3,725,538 | 4/1973 | Brewer | 423/461 |
| 3,848,548 | 11/1974 | Bolejack, Jr. et al. | 110/212 |
| 3,866,888 | 2/1975 | Dydzky | 366/25 |
| 3,893,810 | 7/1975 | Lientz | 422/111 |
| 4,104,736 | 8/1978 | Mendenhall | 366/2 |
| 4,153,471 | 5/1979 | Mendenhall | 106/281.1 |
| 4,171,950 | 10/1979 | Bliemeister | 432/105 |
| 4,211,490 | 7/1980 | Brock et al. | 366/11 |
| 4,298,287 | 11/1981 | McCarter et al. | 366/4 |
| 4,332,206 | 6/1982 | Tucker et al. | 110/203 |
| 4,338,868 | 7/1982 | Lientz | 110/246 |
| 4,420,901 | 12/1983 | Clarke | 47/1.44 |
| 4,424,755 | 1/1984 | Caffyn et al. | 110/246 |
| 4,427,377 | 1/1984 | Dambrine et al. | 432/106 |
| 4,429,642 | 2/1984 | Deve | 110/236 |
| 4,519,990 | 5/1985 | Bevilaqua et al. | 423/210 |
| 4,538,530 | 9/1985 | Whitman | 110/260 |
| 4,555,182 | 11/1985 | Mendenhall | 366/25 |
| 4,575,336 | 3/1986 | Mudd et al. | 432/72 |
| 4,648,332 | 3/1987 | Goedhart | 110/346 |
| 4,648,333 | 3/1987 | Mudd et al. | 110/346 |
| 4,667,609 | 5/1987 | Hardison et al. | 110/236 |
| 4,700,638 | 10/1987 | Prozewalski | 110/346 |
| 4,748,921 | 6/1988 | Mendenhall | 110/346 |
| 4,782,625 | 11/1988 | Gerken et al. | 47/1.42 |
| 4,827,854 | 5/1989 | Collette | 110/237 |
| 4,859,177 | 8/1989 | Kreisberg et al. | 432/14 |
| 4,925,389 | 5/1990 | DeCicco et al. | 432/106 |
| 4,955,986 | 9/1990 | Maury et al. | 432/14 |
| 5,083,870 | 1/1992 | Sindelar et al. | 366/25 |
| 5,305,533 | 4/1994 | Alexander | 34/549 |
| 5,393,501 | 2/1995 | Clawson et al. | 422/187- |

DECONTAMINATION PLANT INCLUDING AN INDIRECTLY HEATED DESORPTION SYSTEM

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

A vast amount of hydrocarbon, chlorinated and halogenated solvent contaminated soil as well as pesticide and herbicide contaminated soils require cleaning up. One method of removing the contaminates from the soil is to heat the soil until the contaminates are vaporized. The contaminate vapors and the decontaminated soil are then removed from the heating chamber and the process is continually repeated until all the soil has been decontaminated.

Rotary dryers and heat exchangers have been used in the past to transfer heat from a hot gas, usually the product of combustion, to the sludge or granular material which it is desired to heat or dry. These rotary drum dryers are generally of two types. Both types employ a horizontal rotating drum through which the sludge or granulated material passes. The drum is generally slightly inclined from the in-feed end to the out-feed end to cause the material being dried to progress down the drum as it rotates. Often mounted within the drum are lift flights of various types designed to agitate the material passing through the drum and/or to cast the material into a falling veil of material where it can interact with gasses passing through the drum. One type of drum heater utilizes indirect heating wherein a furnace or manifold for hot gases surrounds the central portions of the drum, thus heating the exterior of the drum which in turn heats the material passing through the interior of the drum by conduction and radiation. The other type of drum dryer employs direct heating wherein a burner or furnace at one end of the drum introduces hot combustion gases into the interior of the drum. The hot combustion gases directly transfer heat to dry moisture from the sludge or granular material progressing through the drum. The directly fired drum heaters are divided into those in which the combustion gases flow in the same direction as the granular material passing through the drum, and those in which the combustion gases flow in an opposite direction as the granular material which is being dried.

The indirectly heated drum described above is generally inefficient in that once the hot combustion gases surround the central drum, such gases are then exhausted away from the drum. Or, the hot combustion gases are passed through the drum in contact with the material being processed, thus defeating a primary purpose of indirect heating. The directly heated drums cannot address the processing of contaminated soil because the contaminate vapors must not come in contact with the high temperature combustion gases.

What is needed is a more efficient indirectly heated drum. It is to such an indirectly heated drum which the present invention is directed.

BRIEF SUMMARY OF THE INVENTION

The present invention is a decontamination plant for removing contaminates from contaminated material such as soil. Broadly, the decontamination plant comprises an outer shell including a first end, a second end and a cavity therein. The cavity extends generally from the first end to the second end of the outer shell.

A drum formed of a heat conductive material is provided. The drum is rotatably mounted in the cavity defined by the outer shell so as to form an annular heating chamber between an exterior surface of the drum and an interior surface of the outer shell. The drum also has an inner surface defining a decontamination chamber. The decontamination chamber is isolated from the annular heating chamber such that contaminate vapors will not come in contact with the high temperature combustion gases which are present in the annular heating chamber as will be discussed below. The drum is also provided with a material receiving opening and a material discharging opening in communication with the decontamination chamber. The material receiving opening of the drum is disposed a distance beyond the first end of the outer shell, and the material discharge opening of the drum is also disposed a distance beyond the second end of the outer shell such that a portion of the inner surface of the drum, which is located generally between the first end and the second end of the outer shell, forms a first heat exchange surface. The drum is slightly inclined from the material receiving opening to the material discharging opening so as to cause the material being decontaminated to progress through the decontamination chamber from the material receiving opening to the material discharging opening as the drum rotates.

A tube formed of a heat conductive material is provided. The tube is concentrically supported within the decontamination chamber formed in the drum. The tube has an inner surface defining an effluent gas discharge cavity, and an outer surface defining a second heat exchange surface. The tube has an inlet and an outlet in communication with the effluent gas discharge cavity. The inlet of the tube communicates with the annular heating chamber so as to receive flue gases therefrom, and the outlet is positioned to exhaust flue gases from the drum.

A first set of heat sources are provided in the annular heating chamber. The individual heat sources in the first set are spacially disposed about the axial length of the annular heating chamber and positioned to discharge heat into the annular heating chamber. In one aspect of the present invention, a second set of heat sources are also provided in the annular heating chamber. The individual heat sources in the second set are spacially disposed about the axial length of the annular heating chamber and are disposed generally opposite the individual heat sources in the first set.

When the heat sources in the first and second sets are discharging heat into the annular heating chamber, the drum is heated by radiation and by the heated flue gases flowing about the drum. In response thereto, the drum conducts heat to the first heat exchange surface thereof. The heated flue gases are then directed through the effluent gas discharge cavity of the tube from the inlet to the outlet thereof to heat the tube and thereby conduct heat to the second heat exchange surface, whereby material flowing through the decontamination chamber is heated conductively when in contact with either the first or second heat exchange surfaces.

Thus, it can be seen that the present invention is an improvement over the prior art in that it provides a tube which is concentrically supported within the decontamination chamber and which receives heated flue gases which have already been in contact with the exterior of the drum and directs these flue gases through the tube to heat the second heat exchange surface and thereby increase the efficiency of the decontamination plant.

A BRIEF DESCRIPTION OF THE SEVERAL VIEWS OF THE DRAWING

DETAILED DESCRIPTION OF THE INVENTION DEFINITIONS

The term "indirectly heated" as used herein means a system where heat sources such as combustion burners, which generate heat energy for the decontamination plant, must be contained in a totally isolated cell such that the high temperature combustion or flue gases do not come in direct contact with contaminate vapors.

The term "radiation" as used herein means a direct line of sight function requiring an object to directly look at a flame of a burner system in order to receive the infrared energy transfer therefrom.

The term "convection" as used herein means a system which heats one median which in turn transfers the heat to another median. The terms "heating by conduction" means causing an energy transfer by heating a surface and allowing that surface to transfer its energy by physical contact with another surface or median.

The terms "contaminated material" means material which is contaminated with chlorinated and halogenated solvents, or pesticides and/or herbicides, or any other chemicals or contaminates, such as hydrocarbons.

The terms "decontaminated material", as used herein means material which is substantially free of the contaminates, and does not endanger health.

The Embodiment of FIGS. 1–5

Figure 1:
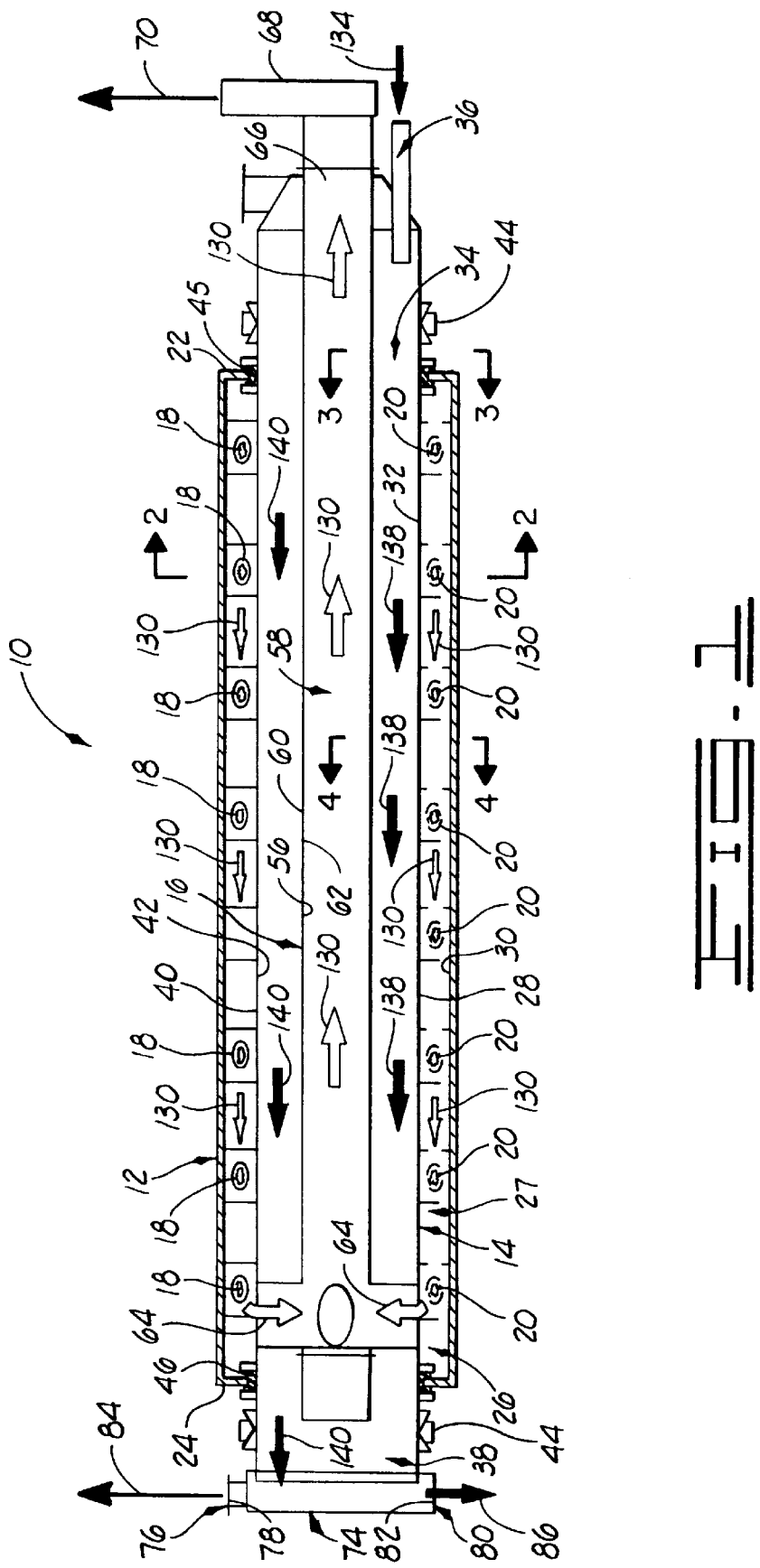
FIG. 1 is a schematic, side elevational view, partially in cross-section, of a decontamination plant constructed in accordance with the present invention illustrating the flow of material, contaminate vapors and flue gases therethrough.

Referring now to the drawings, and more particular to FIG. 1, shown therein is a schematic, cross-sectional view of a decontamination plant 10 constructed in accordance with the present invention.

The decontamination plant 10 is provided with an outer shell 12, a drum 14, a tube 16, a first set of heat sources 18 and second set of heat sources 20.

The outer shell 12 of the decontamination plant 10 is provided with a first end 22, a second end 24, and a cavity 26. The cavity 26 extends generally from the first end 22 to the second end 24 thereof. The outer shell 12 may have an outer diameter of about eight feet. The outer shell 12 may be lined with of 2400° F. rated, six inch thick, high density (twelve pounds per cubic feet) ceramic block insulation.

The drum 14 is formed of a heat conductive material and is rotatably mounted in the cavity 26 defined by the outer shell 12 so as to form an annular heating chamber 27 in between an exterior surface 28 of the drum 14 and an interior surface 30 of the outer shell 12. The drum 14 has an inner surface 32 defining a decontamination chamber 34. The decontamination chamber 34 is isolated from the annular heating chamber 27.

The drum 14 has a material receiving opening 36 and a discharge end portion 38. The material receiving opening 36 and the discharge end portion 38 communicate with the decontamination chamber 34. The material receiving opening 36 is disposed a distance beyond the first end 22 of the outer shell 12. The discharge end portion 38 is disposed a distance beyond the second end 24 of the outer shell 12.

Figure 2:
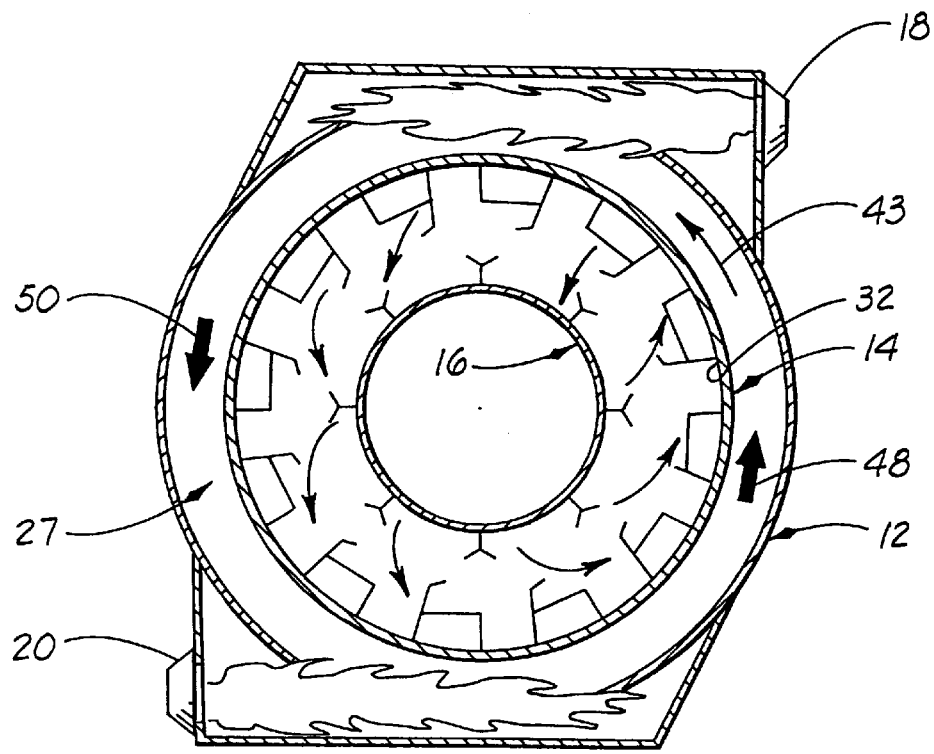
FIG. 2 is a schematic, cross-sectional view of the decontamination plant taken generally along the lines 2—2 depicted in FIG. 1.

The drum 14 is provided with a medial portion 40 which extends generally between the first end 22 of the outer shell 12, and the second end 24 of the outer shell 12. A first heat exchange surface 42 is formed by the inner surface 32 along the medial portion 40 of the drum 14. As will be described in more detail below, the drum 14 is slightly inclined from the material receiving opening 36 to the discharge end portion 38 so as to cause the material being decontaminated to progress through the decontamination chamber 34 from the material receiving opening 36 to the discharge end portion 38 as the drum 14 rotates. The direction of rotation of the drum 14 is indicated in FIG. 2 by an arrow 43. As the material progresses through the decontamination chamber 34, such material comes into contact with the first heat exchange surface 42 and is thereby heated by conduction. The drum 14 may be selectively rotated by four variable speed trunion drive systems (not shown) and is rotatably supported by conventional trunions 44.

A first seal 45 is provided between the first end 22 of the outer shell 12 and the exterior surface 28 of the drum 14. A second seal 46 is provided between the second end 24 of the outer shell 12 and the exterior surface 28 of the drum 14. The first seal 45 and the second seal 46 can be multi-stage labyrinth seals which function to seal each end of the annular heating chamber 27 to allow the first and second sets of heat sources 18 and 20 to operate in an internal vacuum.

The individual heat sources 18 in the first set are spacially disposed about the axial length of the annular heating chamber 27 and positioned to discharge heat into the annular heating chamber 27. The individual heat sources 20 in the second set are also spacially disposed about the axial length of the annular heating chamber 27 and positioned to discharge heat into the annular heating chamber 27. As best shown in FIG. 2, the individual heat sources 18 in the first set are disposed on a side of the outer shell 12 about opposite from the individual heat sources 20 in the second set. The heat sources 18 and 20 in the first and second sets are typically 4.6 mm btuh burners.

The heat sources 18 in the first set are positioned to inject heat into the annular heating chamber 27 in a direction about opposite to the injection of heat into the annular heating chamber 27 by the heat sources 20 in the second set. The heat sources 18 and 20 in the first and second sets are preferably controlled in banks or zones of four heat sources per zone. The two zones or eight heat sources 18 in the first set fire opposing the other eight heat sources 20 in the second set. This creates a turbine effect by utilizing the flame explosion speed (2,000 to 3,000 miles per hour) to accelerate and continue to boost the combustion gas speed within the annular heating chamber 27 in between the drum 14 and the outer shell 12 to approximately 1,800 to 2,000 feet per minute. It is this speed and turbulence that distributes the heat evenly throughout the drum 14 and elevates heat transfer efficiency through the drum 14 to the first heat exchange surface 42 to its highest level. The direction of the flue or combustion gases in the annular heating chamber 27 is shown in FIG. 2 by the arrows 48 and 50.

The tube 16 is concentrically supported within the decontamination chamber 34 formed in the drum 14. The tube 16 is generally formed of a heat conductive material, such as steel. The tube 16 has an inner surface 56 defining an effluent gas discharge cavity 58. The tube 16 is also provided with an outer surface 60 which defines a second heat exchange surface 62. The tube 16 has a pair of inlets 64 and an outlet 66 which communicate with the effluent gas discharge cavity 58. The inlets 64 of the tube 16 communicate with the annular heating chamber 27. The outlet 66 is positioned to exhaust the flue gases away from the drum 14. The tube 16 is pivotally connected to a stationary stack 68 so that the flue gases can exit from the outlet 66 and pass through the stack 68. The flue gases can then pass to the atmosphere or be used for any other heat transfer use as indicated by an arrow 70. As the flue gases pass through the effluent gas discharge cavity 58 formed in the tube 16, such flue gases heat the tube 16 such that the second heat exchange surface 62 is heated by conduction. The heating of the second heat exchange surface 62 provides additional heat transfer surface area for heating the material passing through the decontamination chamber 34.

The decontamination plant 10 is also provided with a stationary discharge assembly 74. The discharge assembly 74 communicates with the discharge end portion 38 of the drum 14. The discharge assembly 74 is provided with a first port 76 formed through an upper end 78 thereof, and a second port 80 formed through a lower end 82 thereof. The first port 76 is adapted to selectively discharge contaminates which have been vaporized while passing through the decontamination chamber 34 of the decontamination plant 10. The vaporized contaminates are drawn through the first port 76 (as indicated by an arrow 84) via an exhaust fan (not shown) which maintains a vacuum on the decontamination chamber 34 so as to direct all vaporized contaminate gases through, for example, a fabric filter bag house (not shown) to remove particulates from the vaporized contaminate gases before entering a multi-purpose scrubber system for neutralization of contaminate vapors if required.

The second port 80 of the discharge assembly 74 is adapted to selectively receive and discharge decontaminated material from the discharge end portion 38 of the drum 14, as indicated by an arrow 86. A bin (not shown) or any other suitable structure can be positioned adjacent the second port 80 to receive the decontaminated material therefrom.

Figure 3:
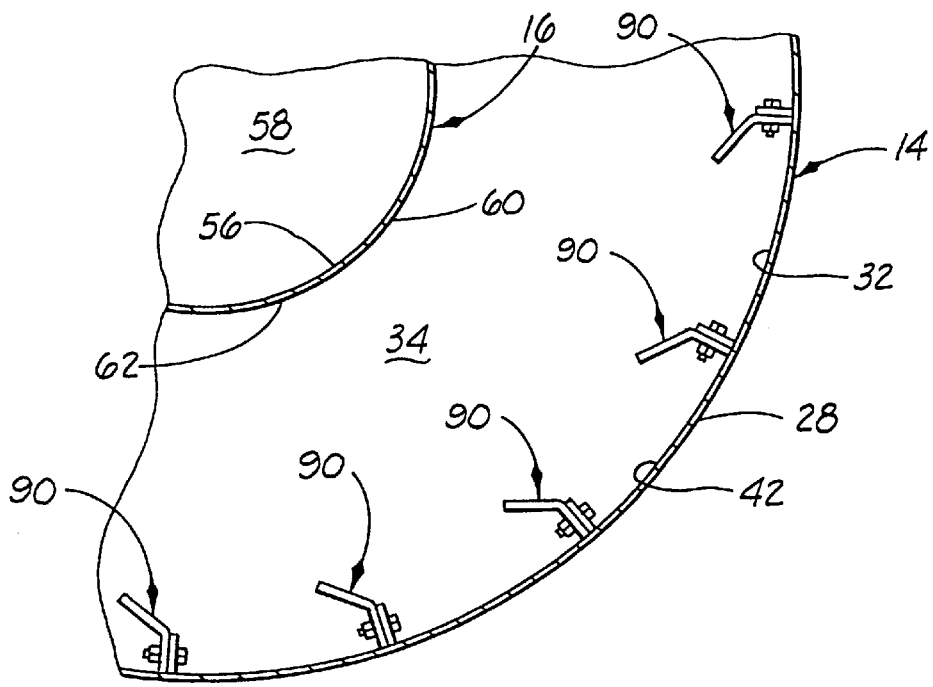
FIG. 3 is a partial, cross-sectional view of the decontamination plant taken along the lines 3—3 depicted in FIG. 1.

Referring now to FIG. 3, shown therein is a partial, cross-sectional view of the decontamination plant 10 taken along the lines 3—3 in FIG. 1. A plurality of first lifters 90 are spacially disposed on the inner surface 32 of the drum 14. The first lifters 90 extend along the axial length of the drum 14, generally between the material receiving opening 36 to approximately the end of the cavity 26. The lifters 90 veil the material being dried across the drum 14 as the drum 14 rotates.

Figure 4:
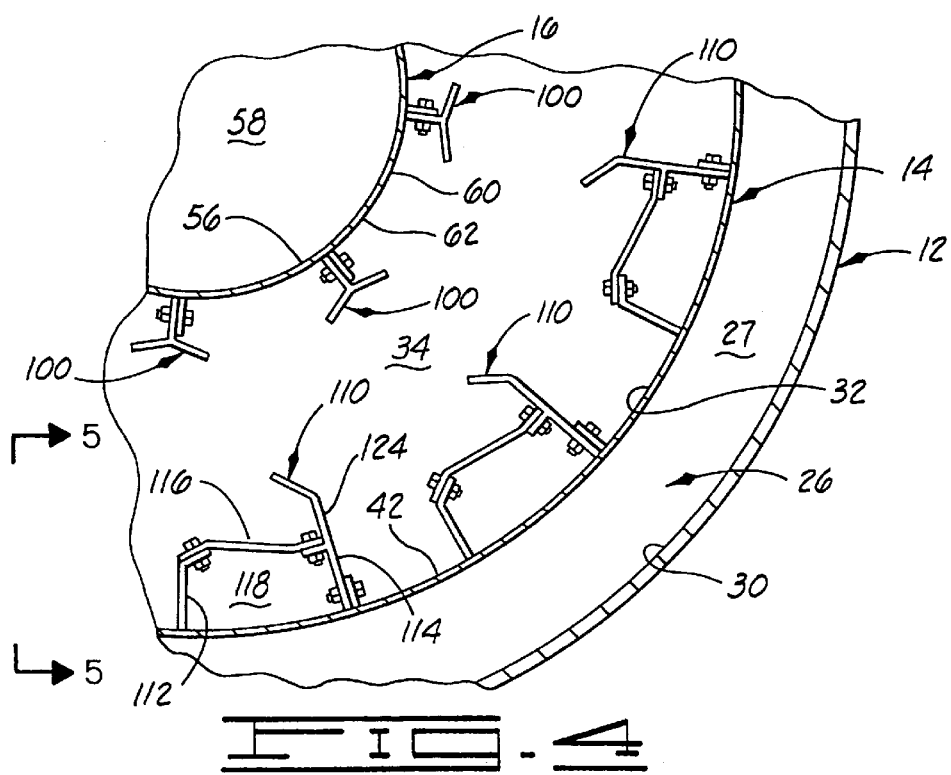
FIG. 4 is a partial, cross-sectional view of the decontamination plant taken along the lines 4—4 depicted in FIG. 1.

Referring now to FIG. 4, shown therein is a partial, cross-sectional view of the decontamination plant 10 taken along the lines 4—4 depicted in FIG. 1. A plurality of substantially Y-shaped second lifters 100 are spacially disposed and mounted on the second heat exchange surface 62 of the tube 16 substantially as shown. The second lifters 100 serve to increase the amount of surface area of the second heat exchange surface 62, and also to selectively gather and maintain the material passing through the decontamination chamber 34 on the second heat exchange surface 62 so as to enhance the amount of conductive heat transfer from the second heat exchange surface 62 to the material. By enhancing the amount of conductive heat transfer from the second heat exchange surface 62 to the material, the overall efficiency of the decontamination plant 10 is also enhanced. As shown in FIG. 4, the second lifters 100 extend along the axial length of the tube 16 a distance generally coincident with the length of the cavity 26.

Figure 5:
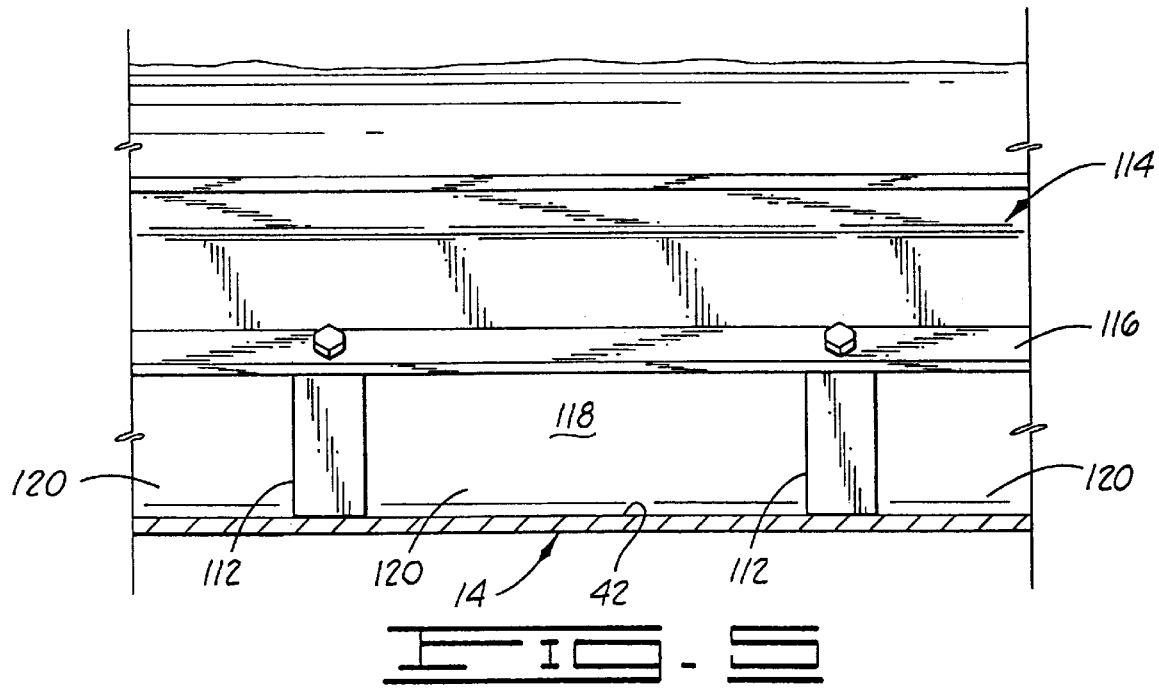
FIG. 5 is a partial, cross-sectional view of the decontamination plant depicted in FIG. 4, taken along the lines 5—5 depicted in FIG. 4.

Also shown in FIGS. 4 and 5 are a plurality of spacially disposed third lifters 110 mounted on the first heat exchange surface 42 of the drum 14. The third lifters 110 extend generally along the axial length of the drum 14 a distance generally coincident with the length of the cavity 26. Each of the third lifters 110 are substantially identical in construction and function. Thus, only one of the third lifters 110 will be specifically described herein for purposes of clarity. The third lifters 110 are provided with a plurality of spacially disposed first supports 112 mounted on the first heat exchange surface 42 of the drum 14. The first supports 112 extend generally away from the first heat exchange surface 42, as shown in FIGS. 4 and 5. Each third lifter 110 is also provided with a continuous second support 114 mounted on the first heat exchange surface 42 of the drum 14. A laterally extending and substantially continuous third support 116 is mounted on the first supports 112, and the second support 114. The first supports 112, the second support 114, and the third support 116 cooperate to provide a material receiving cavity 118 which receives material through a plurality of material receiving openings 120 (FIG. 5) defined in between the spacially disposed first supports 112. The third lifter 110 is also provided with a forwardly extending portion 124 formed on or supported by the second support 114. The forwardly extending portion 124 extends generally from the third support 116 so as to trap or gather a quantity of material onto the third support 116 as the drum 14 rotates. This causes the quantity of material to be heated by conduction via the contact between the quantity of material and the heated forwardly extending portion 124 and the heated third support 116.

In operation, a quantity of material passes through the material receiving openings 120 into the material receiving cavity 118 as the drum 14 rotates. The quantity of material is then held in constant contact with the first heat exchange surface 42 until the quantity of material is discharged through the material receiving openings 120 by gravity, as best shown in FIG. 2. Thus, it can be seen that the third lifters 110 function to increase the surface area of the first heat exchange surface 42, and to maintain the quantity of material in contact with the first heat exchange surface 42 for an enhanced length of time during the rotation of the drum 14. This enhances the amount of conductive heat transfer from the first heat exchange surface 42 to the material and thereby enhances the efficiency of the decontamination plant 10.

Operation

The operation of the decontamination plant 10 is best shown in FIGS. 1 and 2. Initially, the heat sources 18 and 20 in the first and second sets are selectively actuated to preheat the first and second heat exchange surfaces 42 and 62, and to thereby preheat the decontamination chamber 34. The direction of movement of the flue gases is indicated in FIG. 1 by the arrows 130. The motors (not shown) which rotate the drum 14 are then actuated to cause the drum 14 to rotate. Once the drum 14 is rotating, contaminated material, such as chlorinated and halogenated soil, is introduced through the material receiving opening 36 formed in the drum 14 as indicated by an arrow 134. As best shown in FIG. 2, the material passing through the decontamination chamber 34 from the material receiving opening 36 to the discharge end portion 38 of the drum 14 is lifted and held against the first and second heat exchange surfaces 42 and 62 by the first, second, and third lifters 90, 100, and 110 where conductive heat transfer from the first and second heat exchange surfaces 42 and 62 is accomplished. The contaminated material is thereby heated for a suitable amount of time as the contaminated material passes through the decontamination chamber 34. The direction of movement of the material passing through the decontamination chamber 34 is indicated by the arrows 138. The direction of movement of the vaporized contaminates through the decontamination chamber 27 is indicated by the arrows 140. When the contaminated material is soil, the material can be maintained in the decontamination chamber 34 for a predetermined time of about six to twelve minutes to heat the material from about 650° F. to about 950° F. The amount of time that it takes for the contaminated material to pass through the decontamination chamber can be varied by changing the incline angle of the drum 14 or the speed of the rotation of the drum 14.

A main exhaust fan (not shown) maintains a vacuum on the decontamination chamber 34 of the drum 14 to direct all vaporized contaminates through the first port 76, as previously discussed. The decontaminated material is discharged through the second port 80, as previously discussed.

The flow of the flue gases relative to the material and vaporized contaminants is best shown in FIG. 1. As indicated by the arrows 130, 138 and 140, the flue gases travel in substantially the same direction as the material and vaporized contaminants as the flue gases travel in the annular heating chamber 27. However, as the flue gases are exhausted through the tube 16, the direction of the travel of same is reversed such that the flue gases travel in a direction opposite to the direction of travel of the material and vaporized contaminants.

It should be noted that the drum 14 is subject to heat well above 1800° F. Therefore, the drum 14 should be fabricated of a material capable of withstanding such intense heat. The drum 14 may, for example, be constructed of stainless steel.

Changes may be made in the construction and the operation of the varies components, elements, and assemblies described herein and changes may be made in the steps or the sequence of steps of the methods described herein without departing from the spirit and the scope of the invention as defined in the following claims.

What is claimed is:

1. A decontamination plant for removing contaminants from material, the decontamination plant comprising:
   an outer shell defining a cavity therein;
   a drum formed of a heat conductive material and mounted in the cavity defined by the outer shell so as to form a heating chamber in between the drum and the outer shell, the drum having an inner surface defining a decontamination chamber and forming a first heat exchange surface, the decontamination chamber being isolated from the heating chamber;
   a first set of heat sources positioned to discharge heat and flue gases into the heating chamber; and
   a tube supported within the decontamination chamber formed in the drum, the tube having an outer surface defining a second heat exchange surface, the tube having an inlet and an outlet, the inlet of the tube communicating with the heating chamber and the outlet being positioned to exhaust flue gases from the drum whereby the flue gases flow about the drum to conduct heat to the first heat exchange surface, and then flow through the tube to conduct heat to the second heat exchange surface.

2. A decontamination plant as defined in claim 1, wherein the drum is rotatably mounted in the cavity defined by the outer shell.

3. A decontamination plant as defined in claim 1, wherein the heat sources in the first set are spacially disposed about the axial length of the heating chamber.

4. A decontamination plant as defined in claim 1, wherein the tube is concentrically supported in the decontamination chamber formed in the drum.

5. A decontamination plant as defined in claim 1, further comprising:
   a stationary stack pivotally connected to the outlet of the tube.

6. A decontamination plant as defined in claim 1, wherein the flow of flue gases through the tube is in a direction generally opposite to the flow of material through the decontamination chamber.

7. A decontamination plant as defined in claim 1, further comprising a plurality of lifters spacially disposed and mounted on the second heat exchange surface of the tube, the lifters extending along at least a portion of the axial length of the tube.

8. A decontamination plant as defined in claim 7, wherein the lifters include a Y-shaped cross-section.

9. A decontamination plant as defined in claim 1, further comprising a plurality of spatially disposed lifters mounted on the first heat exchange surface of the drum, the lifters extending generally along the axial length of at least a portion of the drum.

10. A decontamination plant as defined in claim 9, wherein each of the lifters comprise:
    a plurality of spacially disposed first supports mounted on the first heat exchange surface of the drum, the spacially disposed first supports defining at least one material receiving opening therebetween;
    a continuous second support mounted on the first heat exchange surface of the drum;
    a third support being mounted on the first supports and the second support, the first supports, second support and third support cooperating to provide a material receiving cavity.

11. A decontamination plant as defined in claim 10, further comprising a forwardly extending portion extending from the third support, the forwardly extending portion being capable of gathering a quantity of material onto the third support as the drum rotates.

12. A decontamination plant for removing contaminants from material, the decontamination plant comprising:
    an outer shell including a first end, a second end and a cavity therein, the cavity extending generally from the first end to the second end thereof;
    a drum formed of a heat conductive material and rotatably mounted in the cavity defined by the outer shell so as to form an annular heating chamber between the drum and the outer shell, the drum having an inner surface defining a soil decontamination chamber, the decontamination chamber being isolated from the annular heating chamber, the drum having a material receiving opening and a material discharging opening in communication with the decontamination chamber, the material receiving opening being disposed a distance beyond the first end of the outer shell, and the material discharging opening being disposed a distance beyond the second end of the outer shell such that a portion of the inner surface of the drum, which is located generally between the first end and the second end of the outer shell, forms a first heat exchange surface;
    a tube formed of a heat conductive material and concentrically suspended within the soil decontamination chamber formed in the drum, the tube having an inner surface defining an effluent gas discharge cavity, and an outer surface defining a second heat exchange surface, the tube having an inlet and an outlet in communication with the effluent gas discharge cavity, the inlet of the tube being in communication with the annular heating chamber and the outlet being positioned to exhaust gases from the drum; and a first set of heat sources, the heat sources being spatially disposed about the axial length of the annular heating chamber and positioned to discharge heat into the annular heating chamber whereby the flue gases flow about the drum to conduct heat to the first heat exchange surface, and whereby the flue gases flow through the tube from the inlet to the outlet thereof to conduct heat to the second heat exchange surface whereby soil flowing through the soil decontamination chamber is heated conductively when in contact with both the first and second heat exchange surfaces.

* * * * *